(12) United States Patent
Kato et al.

(10) Patent No.: US 10,950,841 B2
(45) Date of Patent: Mar. 16, 2021

(54) BATTERY PACK

(71) Applicant: Yazaki Corporation, Tokyo (JP)

(72) Inventors: Takuya Kato, Shizuoka (JP); Takahiro Syouda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 66 days.

(21) Appl. No.: 16/241,927

(22) Filed: Jan. 7, 2019

(65) Prior Publication Data

US 2019/0288263 A1    Sep. 19, 2019

(30) Foreign Application Priority Data

Mar. 16, 2018    (JP) .............................. JP2018-049450

(51) Int. Cl.
*H01M 2/26* (2006.01)
*H01M 2/22* (2006.01)
*H01M 2/30* (2006.01)
*H01M 2/20* (2006.01)
*H01M 2/10* (2006.01)

(52) U.S. Cl.
CPC ......... *H01M 2/206* (2013.01); *H01M 2/1077* (2013.01); *H01M 2/202* (2013.01); *H01M 2/26* (2013.01); *H01M 2/30* (2013.01); *H01M 2220/20* (2013.01)

(58) Field of Classification Search
None
See application file for complete search history.

(56) References Cited

U.S. PATENT DOCUMENTS

| 2009/0297892 A1* | 12/2009 | Ijaz ....................... H01M 2/204 429/7 |
| 2016/0111760 A1 | 4/2016 | Arai |
| 2016/0181579 A1 | 6/2016 | Geshi et al. |

FOREIGN PATENT DOCUMENTS

JP    6229903 B2    11/2017

* cited by examiner

*Primary Examiner* — Yoshitoshi Takeuchi
(74) *Attorney, Agent, or Firm* — Kenealy Vaidya LLP

(57) ABSTRACT

Provided is a battery pack in which a bus bar for modules is provided on one side of a plurality of battery modules in a height direction, and connects the battery modules that are adjacent to each other among the plurality of battery modules, in series. In addition, the bus bar for modules includes a first bus bar piece that is provided in a battery module on one side between the battery modules that are adjacent to each other, and a second bus bar piece that is provided in a battery module on the other side and is different from the first bus bar piece, and a connection portion that connects the first bus bar piece and the second bus bar piece.

1 Claim, 6 Drawing Sheets

BATTERY PACK

CROSS-REFERENCE TO RELATED APPLICATION(S)

The present application claims priority to and incorporates by reference the entire contents of Japanese Patent Application No. 2018-049450 filed in Japan on Mar. 16, 2018.

BACKGROUND OF THE INVENTION

1. Field of the Invention

The present invention relates to a battery pack.

2. Description of the Related Art

In the related art, as a battery pack, for example, Japanese Patent No. 6229903 discloses a battery module including a plurality of battery cells, and first and second connection terminals which electrically connect the plurality of battery cells. In the battery module, the first connection terminal is welded (normally welded) to an electrode of the battery cells, and in a case where welding failure occurs in the normal welding, the second connection terminal is welded to the electrode of the battery cells to suppress discharging of the battery cells.

However, in the battery module described in Japanese Patent No. 6229903, for example, in a case where welding failure occurs in the normal welding, there is a concern that the electrode of the battery cells may be damaged, and thus in this regard, there is room for an improvement.

SUMMARY OF THE INVENTION

Here, the invention has been made in consideration of such circumstances, and an object thereof is to provide a battery pack capable of appropriately connecting a plurality of battery cells.

In order to achieve the above mentioned object, a battery pack according to one aspect of the present invention includes a plurality of battery modules that includes a plurality of battery assemblies and a bus bar for battery assemblies, the plurality of battery assemblies including a plurality of battery cells connected to each other in parallel, being provided to be erected in a height direction in which a positive electrode and a negative electrode are opposite to each other, and being arranged in an even number in a first direction orthogonal to the height direction, the bus bar for battery assemblies connecting the battery assemblies adjacent to each other in the first direction in series; and a bus bar for modules that is provided on one side of the plurality of battery modules in the height direction, and connects the battery modules that are adjacent to each other among the plurality of battery modules, in series, wherein the bus bar for modules includes a first bus bar for modules that is provided in a battery module on one side between the battery modules adjacent to each other, a second bus bar for modules that is provided in a battery module on the other side and is different from the first bus bar for modules, and a connection portion that connects the first bus bar for modules and the second bus bar for modules.

According to another aspect of the present invention, in the battery pack, it is possible to configure that the plurality of battery modules are arranged in a second direction intersecting the first direction.

According to still another aspect of the present invention, in the battery pack, it is possible to configure that the first bus bar for modules (31) includes a first connection counter surface, the second bus bar for modules includes a second connection counter surface, and the connection portion connects the first bus bar for modules and the second bus bar for modules to each other in a state in which the first connection counter surface and the second connection counter surface face each other.

According to still another aspect of the present invention, in the battery pack, it is possible to configure that the connection portion includes a solidification portion that is solidified from a molten body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
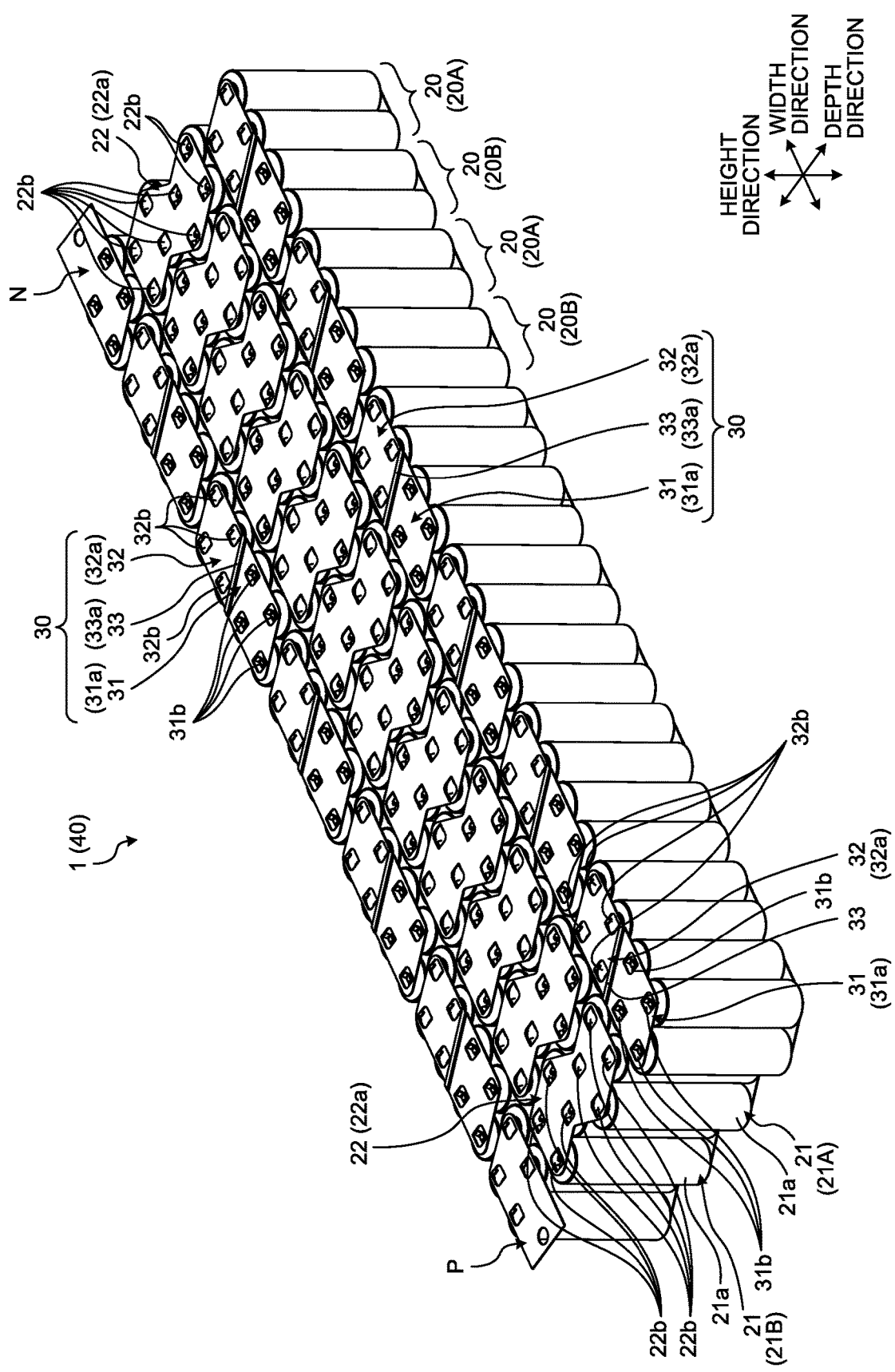
FIG. 1 is a perspective view illustrating a configuration example of a battery pack according to an embodiment.

A mode for carrying out the invention (embodiment) will be described in detail with reference to the accompanying drawings. The invention is not limited by the content described in the following embodiment. In addition, constituent elements which are easily assumed by those skilled in the art and substantially the same constituent elements are included in constituent elements to be described below. In addition, configurations to be described below can be appropriately combined. In addition, various omission, substitutions, and changes of configurations can be made in a range not departing from the gist of the invention.

Embodiment

A battery pack 1 according to an embodiment will be described. For example, the battery pack 1 is mounted on a vehicle such as an electric vehicle (EV), a hybrid vehicle (HEV), and a plug-in hybrid vehicle (PHEV). For example, the battery pack 1 is a power supply that supplies electric power to a drive source such as a motor of the vehicle. As illustrated in FIG. 1, FIG. 2, FIG. 3, FIG. 4, and FIG. 6, the battery pack 1 includes a housing 10, a plurality of battery modules 20, and a plurality of bus bars 30 for modules.

Here, a depth direction (first direction) is a direction in which a plurality of battery assemblies 21 of the battery modules 20 are arranged. A width direction (second direction) is a direction in which the plurality of battery modules 20 are arranged. A height direction is a direction in which a positive electrode and a negative electrode of a battery cell 21a are opposite to each other. The depth direction, the width direction, and the height direction intersect each other. In this embodiment, the depth direction, the width direction, and the height direction are orthogonal to each other. A mounting surface side in which the battery pack 1 is mounted on the vehicle is referred to as a lower side in the height direction, and a side opposite to the mounting surface side is referred to as an upper side in the height direction.

Figure 6:
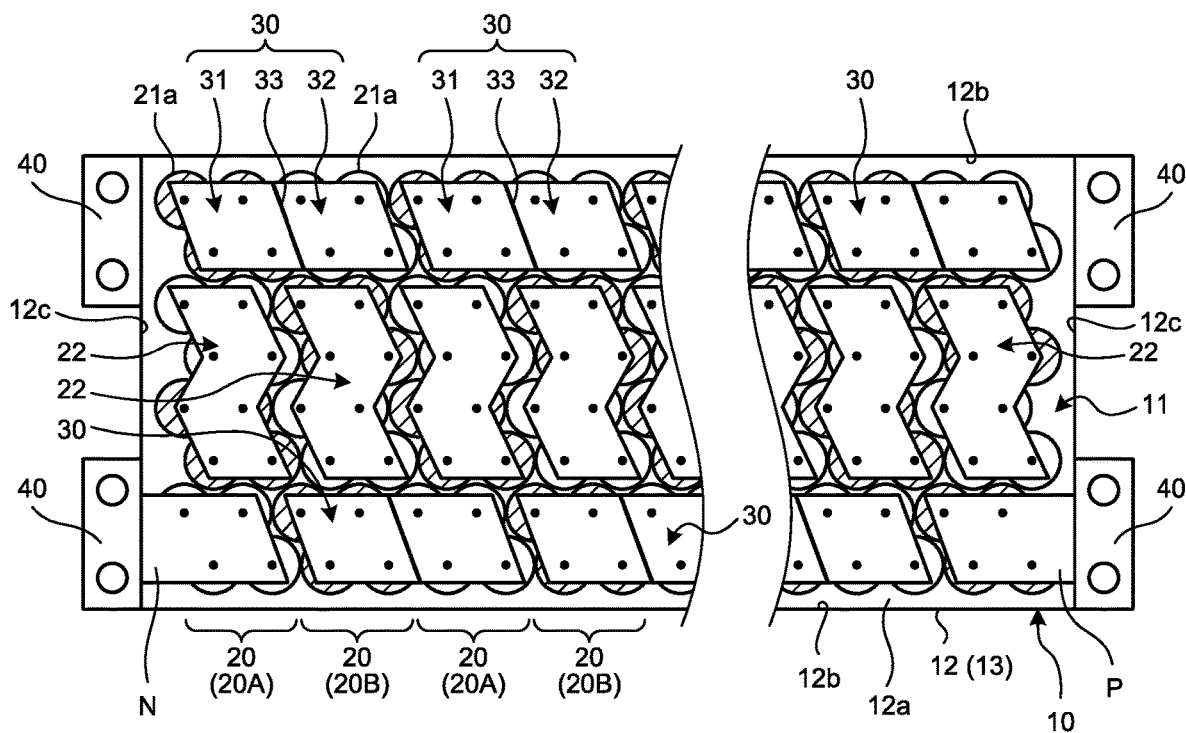
FIG. 6 is a schematic view illustrating the configuration example of the battery module after connection according to the embodiment.

The housing 10 accommodates the respective battery modules 20 and the respective bus bars 30 for modules (refer to FIG. 6). The housing 10 is formed from a material having heat conductivity higher than that of a natural resin, and is formed from by iron, copper, aluminum, or the like as an example. The housing 10 is formed in a box shape having an inner space portion 11. For example, the housing 10 includes a box main body 12 that is formed in a rectangular shape or a cubic shape. The box main body 12 includes a bottom portion 12a that is located on a lower side in the height direction, a pair of first lateral surface portions 12b which face each other in the depth direction, and a pair of second lateral surface portions 12c which face each other in the width direction. In addition, the housing 10 includes an opening portion 13 that is formed by opening an upper side of the box main body 12 in the height direction, and a cover portion (not illustrated) that closes the opening portion 13. Furthermore, in the housing 10, in a case where a waterproof property is required in the battery pack 1, a waterproof structure is formed between the opening portion 13 and the cover portion of the housing 10, and thus the inner space portion 11 is hermetically sealed. The housing 10 functions as the heat dissipation unit, and is provided at a location at which it is easy to release heat of the housing 10. For example, the housing 10 is provided at a location at which an outer surface of the housing 10 can come into contact with an outer heat medium such as external air that is received from the outside of the vehicle.

Figure 2:
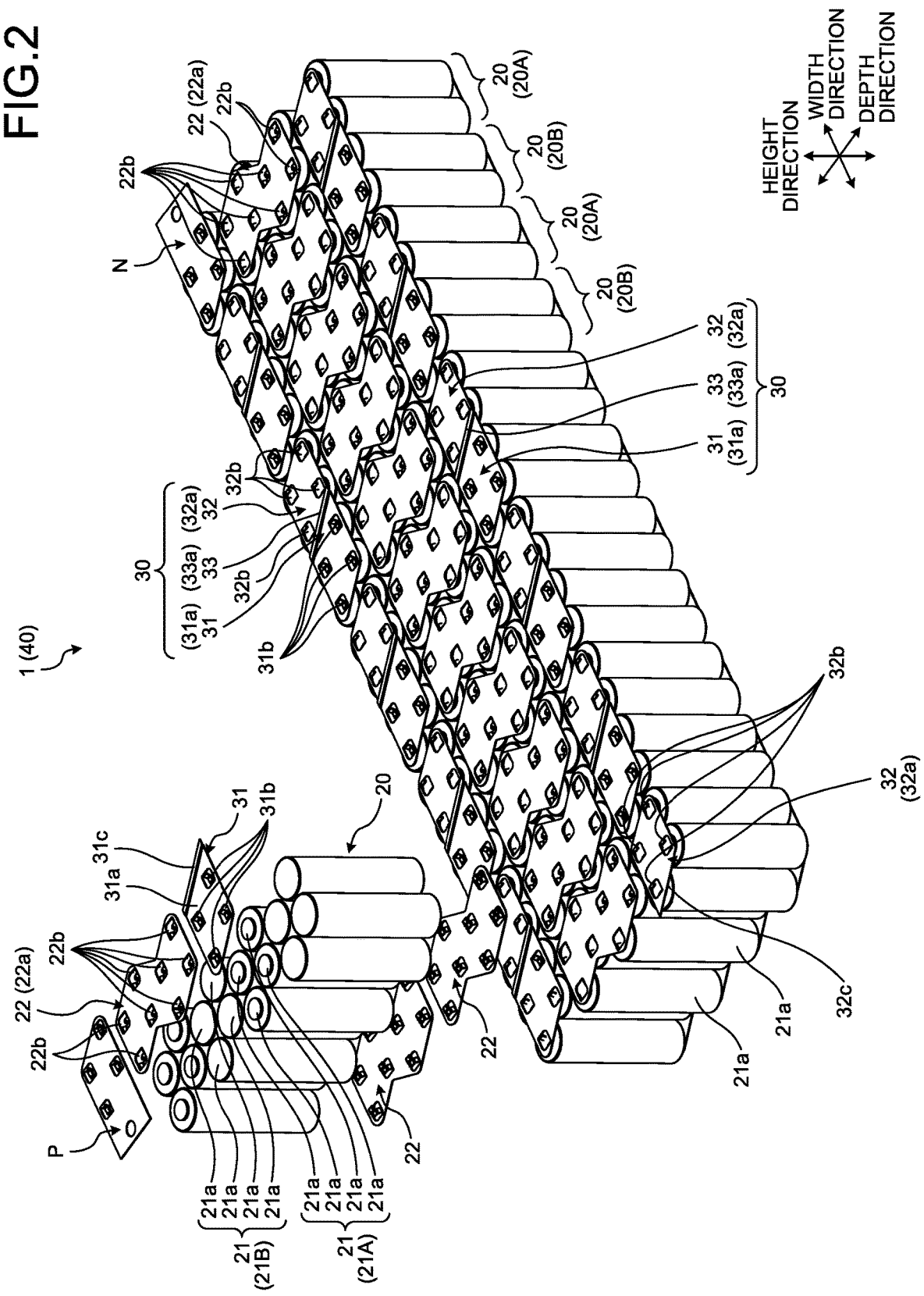
FIG. 2 is an exploded perspective view illustrating the configuration example of the battery pack according to the embodiment.
Figure 3:
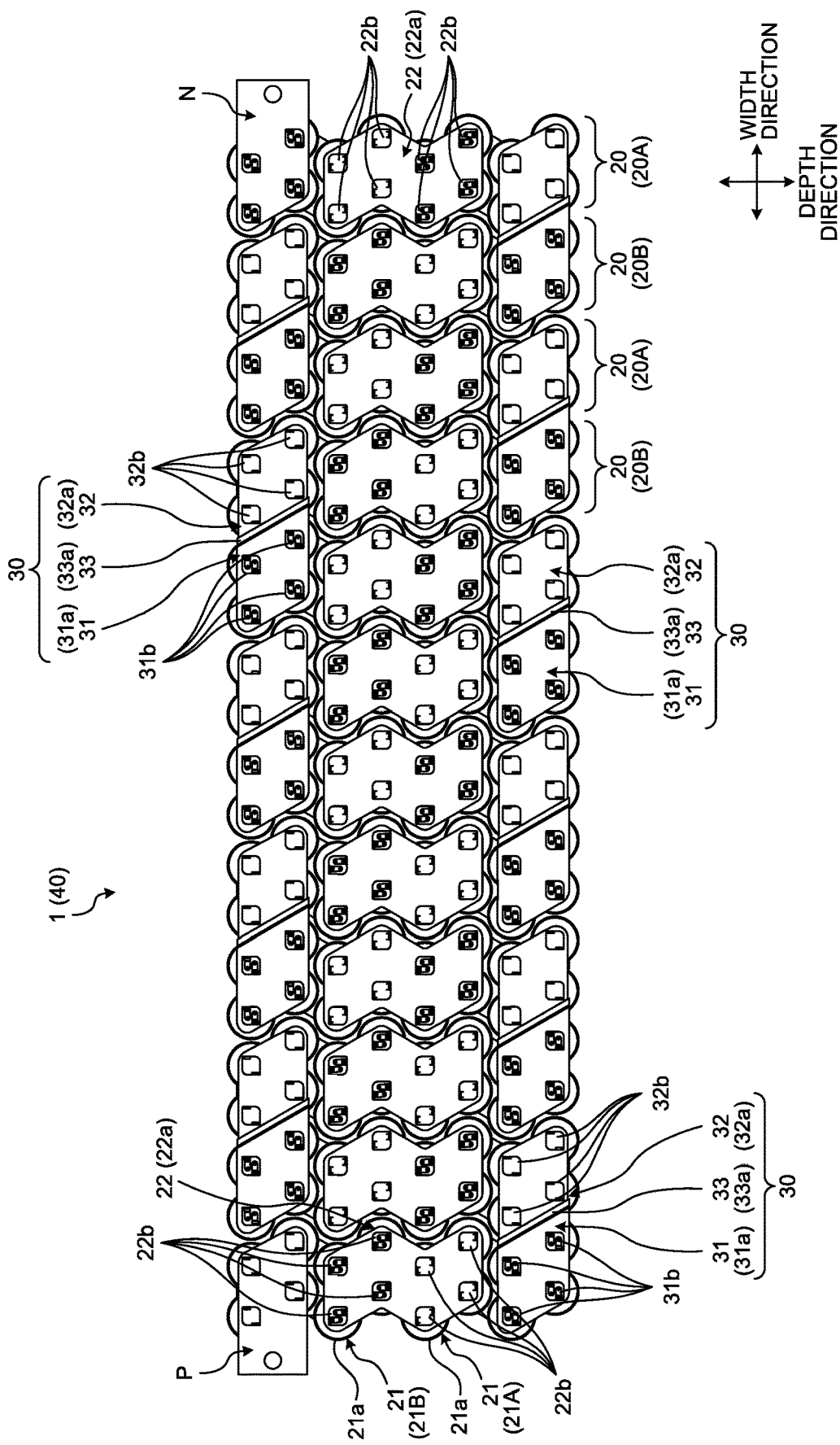
FIG. 3 is a top view illustrating the configuration example of the battery pack according to the embodiment.
Figure 4:
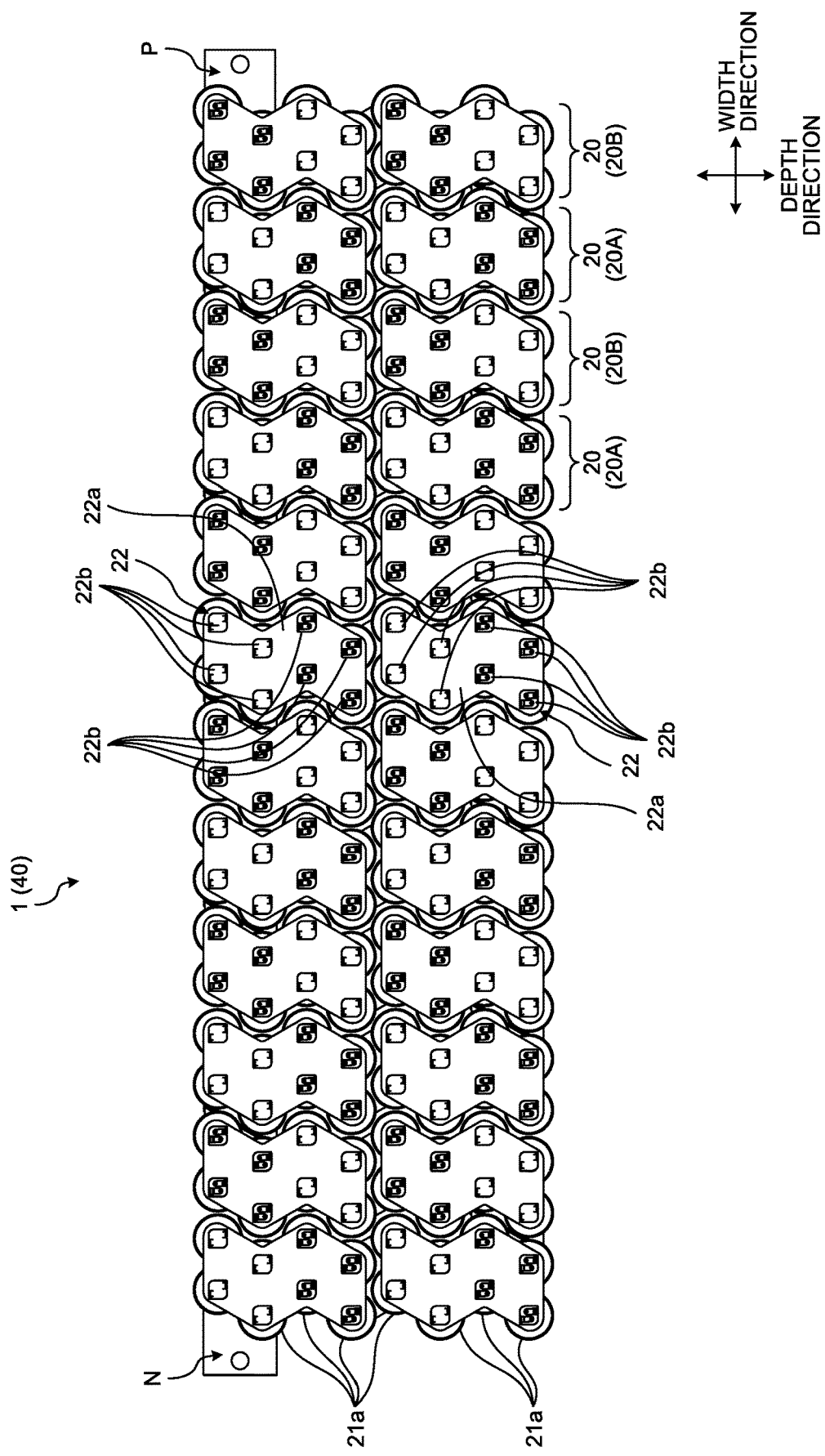
FIG. 4 is a bottom view illustrating the configuration example of the battery pack according to the embodiment.

For example, each of the battery modules 20 includes a plurality of battery assemblies 21 and a bus bar 22 for battery assemblies (refer to FIG. 2 and the like). Each of the battery assemblies 21 includes a plurality of battery cells 21a (for example, four battery cells 21a). Each of the battery cells 21a is configured as a secondary battery capable of being charged and discharged, and is configured as a cylindrical lithium ion battery that extends in the height direction as an example. For example, in the battery assembly 21, the battery cells 21a are arranged in two rows in the depth direction. In the battery assembly 21, the battery cells 21a are electrically connected to each other in parallel. In the battery assembly 21, the battery cells 21a are provided to be erected in the height direction, and the battery cells 21a are disposed to be adjacent to each other.

The bus bar 22 for battery assemblies electrically connects the battery assemblies 21 to each other. In the battery assemblies 21 which are adjacent to each other in the depth direction, the bus bar 22 for battery assemblies electrically connects a positive electrode of a battery assembly 21A on one side and a negative electrode of a battery assembly 21B on the other side, thereby connecting the battery assemblies 21A and 21B to each other in series. The bus bar 22 for battery assemblies is formed from a metallic material having conductivity. The bus bar 22 for battery assemblies includes a bus bar main body 22a that is formed in a flat plate shape, and a plurality of terminals 22b which are provided in the bus bar main body 22a. As the plurality of terminals 22b, for example, eight pieces are provided and are located at sites which face electrodes of the battery cells 21a of the battery assemblies 21 adjacent to each other. That is, in the battery assemblies 21A and 21B which are adjacent to each other, the terminals 22b are located at sites which face positive electrodes of the battery cells 21a of the battery assembly 21A on one side and negative electrodes of the battery cells 21a of the battery assembly 21B on the other side. The terminals 22b protrude from the bus bar main body 22a toward an electrode side of the battery cells 21a. For example, the terminals 22b are electrically connected to electrodes of the battery cells 21a in the battery assemblies 21 adjacent to each other through resistance welding. According to this, the bus bar 22 for battery assemblies can connect the battery assemblies 21, which are adjacent to each other, in series. In one of the battery modules 20, even-numbered (for example, four) battery assemblies 21 are arranged to be adjacent to each other in the depth direction. In the one battery module 20, four battery assemblies 21 are connected to each other in series, and thus the one battery module 20 includes a total of sixteen battery cells 21a.

Each of the bus bars 30 for modules electrically connects the battery modules 20 to each other (refer to FIG. 1, FIG. 2, and the like). In the battery modules 20 which are adjacent in the width direction, the bus bar 30 for modules electrically connect positive electrodes of a battery module 20A on one side and negative electrodes of a battery module 20B on the other side, thereby connecting the battery modules 20A and 20B in series. The bus bar 30 for modules is provided on an upper side in the height direction of the battery modules 20 (refer to FIG. 3). The reason for this is because each of the battery modules 20 is constructed by arranging the battery assemblies 21 in an even number. That is, in the battery modules 20, the battery assemblies 21 are arranged in an even number, and thus electrodes of the battery assemblies 21 that are connected between the battery modules 20 that are adjacent to each other are located on one side (for example, on an upper side) in the height direction of the battery modules 20. The bus bar 30 for modules includes a first bus bar piece 31 as a first bus bar for modules, a second bus bar piece 32 as a second bus bar for modules, and a connection portion 33.

The first bus bar piece 31 is formed from a metallic material having conductivity. The first bus bar piece 31 includes a bus bar main body 31a that is formed in a flat plate shape, and a plurality of terminals 31b which are provided in the bus bar main body 31a. The bus bar main body 31a includes a first connection counter surface 31c (refer to FIG. 2, FIG. 5). The first connection counter surface 31c is an end surface that is provided on an adjacent battery module 20 side. The first connection counter surface 31c is joined to a second connection counter surface 32c of the second bus bar piece 32 to be described later. As the plurality of terminals 31b, for example, four pieces are provided and are located at sites which face electrodes of the battery cells 21a of the battery assembly 21 of the battery modules 20 adjacent to each other. That is, in the battery modules 20 which are adjacent to each other, the terminals 31b are located at sites which face one side between positive electrodes and negative electrodes of the battery cells 21a in the battery assembly 21 of the battery module 20A on one side.

The terminals 31b protrude from the bus bar main body 31a toward electrodes of the battery cells 21a. The terminals 31b are electrically connected to the electrodes of the battery cells 21a of the battery assembly 21 in the battery module 20A on one side through resistance welding.

The second bus bar piece 32 is a bus bar different from the first bus bar piece 31. That is, the first bus bar piece 31 and the second bus bar piece 32 as individual bodies before connection by the connection portion 33 are connected by the connection portion 33 to form the bus bar 30 for modules. The second bus bar piece 32 is formed from a metallic material having conductivity. The second bus bar piece 32 includes a bus bar main body 32a that is formed in a flat plate shape, and a plurality of terminals 32b which are provided in the bus bar main body 32a. The bus bar main body 32a includes the second connection counter surface 32c (refer to FIG. 2, FIG. 5). The second connection counter surface 32c is an end surface that is provided on an adjacent battery module 20 side. The second connection counter surface 32c is connected to the first connection counter surface 31c of the first bus bar piece 31. As the plurality of terminals 32b, for example, four pieces are provided and are located at sites which face electrodes of the battery cells 21a in the battery assembly 21 of the battery modules 20 adjacent to each other. That is, in the battery modules 20 which are adjacent to each other, the terminals 32b are located at sites which face the other side between positive electrodes and negative electrodes of the battery cells 21a in the battery assembly 21 of the battery module 20B on the other side. The terminals 32b protrude from the bus bar main body 32a toward electrodes of the battery cells 21a. The terminals 32b are electrically connected to the electrodes of the battery cells 21a of the battery assembly 21 in the battery module 20B on the other side through resistance welding.

Figure 5:
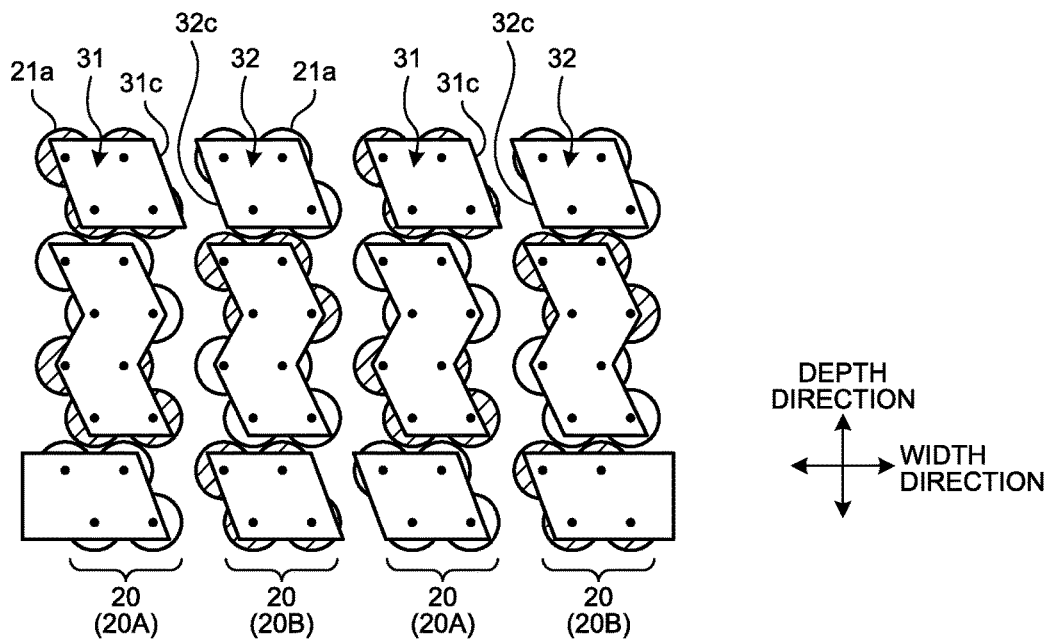
FIG. 5 is a schematic view illustrating the configuration example of a battery module before connection according to the embodiment.

The connection portion 33 connects the first bus bar piece 31 and the second bus bar piece 32 to each other. For example, the connection portion 33 includes a solidification portion 33a that is solidified from a molten body. For example, the molten body is parts of the first and second bus bar pieces 31 and 32, but there is no limitation thereto. The solidification portion 33a is formed as follows. In a state in which the first connection counter surface 31c of the first bus bar piece 31 and the second connection counter surface 32c of the second bus bar piece 32 face each other, parts of the first and second bus bar pieces 31 and 32 are melted by using laser light as a heat source, and are solidified to form the solidification portion 33a. Typically, the solidification portion 33a is formed as follows. As illustrated in FIG. 5 and FIG. 6, a joining site at which the first connection counter surface 31c and the second connection counter surface 32c are joined to each other is irradiated with laser light, and the joining site is melted by the laser light and is solidified to form the solidification portion 33a. According to this, the connection portion 33 can connect the first bus bar piece 31 and the second bus bar piece 32 to each other. As a result, the bus bar 30 for modules can connect the battery modules 20, which are adjacent to each other, in series.

Figure 8:
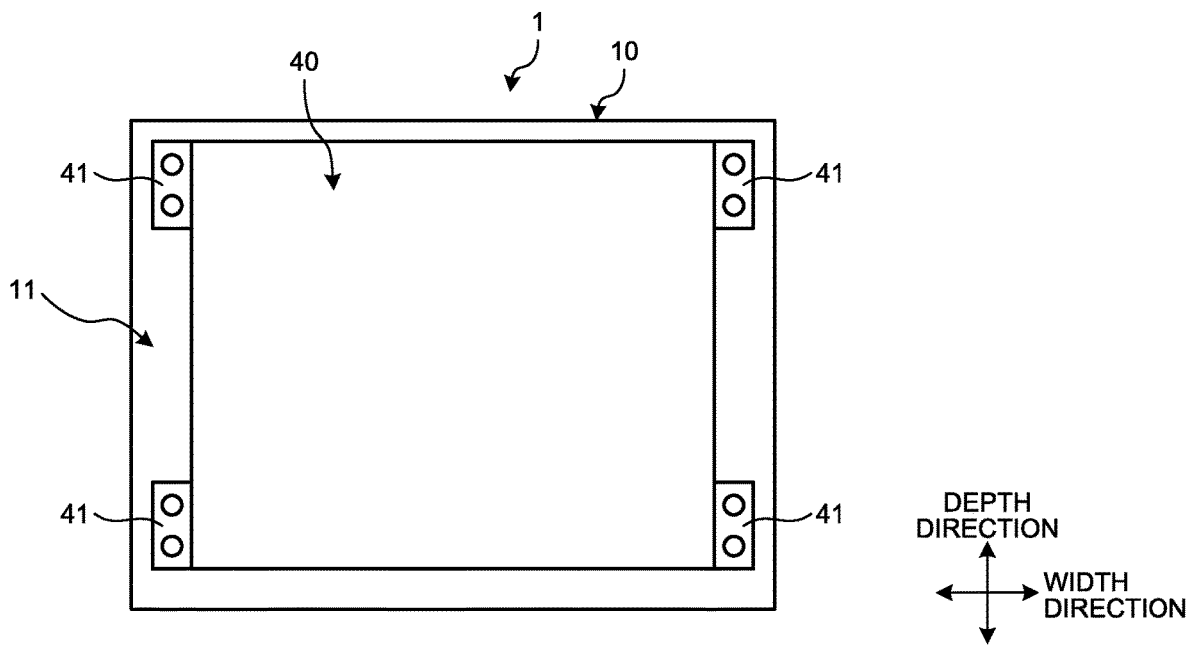
FIG. 8 is a schematic view illustrating the magnitude of the battery pack according to the embodiment.

The battery modules 20 constitute a battery module group 40 in which the battery assemblies 21 are connected in series by the bus bar 22 for battery assemblies, and the battery modules 20 are connected in series by the bus bar 30 for modules (refer to FIG. 8 and the like). The battery module group 40 is accommodated in the inner space portion 11 of the housing 10. In addition, the battery module group 40 includes a holding member 41, and is held to the housing 10 by the holding member 41. For example, in the battery module group 40, twelve battery modules 20 are connected in series, and thus the battery module group 40 includes a total of 192 battery cells 21a. The battery pack 1 is mounted on a vehicle and the like in a state in which the battery module group 40 is held in the housing 10.

As described above, the battery pack 1 according to this embodiment includes the plurality of battery modules 20 and the bus bar 30 for modules. The plurality of battery modules 20 include the plurality of battery assemblies 21 and the bus bar 22 for battery assemblies. The plurality of battery assemblies 21 include the plurality of battery cells 21a that are connected in parallel, are provided to be erected in the height direction in which a positive electrode and a negative electrode are opposite to each other, and are arranged in an even number in the depth direction orthogonal to the height direction. The bus bar 22 for battery assemblies connects the battery assemblies 21 that are adjacent to each other in the depth direction, in series. The bus bar 30 for modules is provided on one side of the plurality of battery modules 20 in the height direction, and connects the battery modules 20 that are adjacent to each other among the plurality of battery modules 20, in series. In addition, the bus bar 30 for modules includes the first bus bar piece 31 that is provided in a battery module 20 on one side between the battery modules 20 that are adjacent to each other, and the second bus bar piece 32 that is provided in a battery module 20 on the other side and is different from the first bus bar piece 31, and the connection portion 33 that connects the first bus bar piece 31 and the second bus bar piece 32.

According to this configuration, in the battery pack 1, the battery assemblies 21 are connected to each other by the bus bar 22 for battery assemblies, and it is possible to form individual battery modules 20 which are subdivided from the entirety of the battery modules 20 (battery module group 40). In the battery pack of the related art, the entirety of the battery assemblies 21 are connected through resistance welding. Therefore, in a case where welding failure occurs in the course of the resistance welding, it is necessary discard the battery cells 21a (for example, 192 pieces to the maximum) which are welded at that time, and thus manufacturing loss was relatively great. In contrast, in the battery pack 1 of this embodiment, the battery assemblies 21 are connected through resistance welding in a unit of the battery module 20. Accordingly, even when welding failure occurs in the resistance welding in the course of the resistance welding, the battery cells 21a (for example, sixteen pieces) corresponding to one battery module 20 to the maximum may be discarded, and thus it is possible to further suppress the manufacturing loss in comparison to the battery pack of the related art. In addition, in the battery pack 1, for example, the first bus bar piece 31 and the second bus bar piece 32 are welded with a laser to connect the battery modules 20 to each other. Accordingly, even when the welding failure occurs in the laser welding, it is possible to attempt the laser welding again, and thus it is also possible to suppress the battery modules 20 from being discarded. In addition, in the battery pack 1, the entirety of a plurality of the bus bar 30 for modules are provided on an upper side of the battery modules 20 in the height direction, and thus it is possible to weld the entirety of a plurality of the first bus bar pieces 31 and a plurality of the second bus bar pieces 32 with a laser from an upper side in the height direction. As a result, it is possible to improve workability. In addition, in the battery pack 1, total positive electrodes P and total negative electrodes N, which are connected to a load unit (not illustrated) that supplies electric power, can be located on one side (for example, an upper side) in the height direction, and thus it is possible to improve workability of wiring connection to the load unit.

Figure 7:
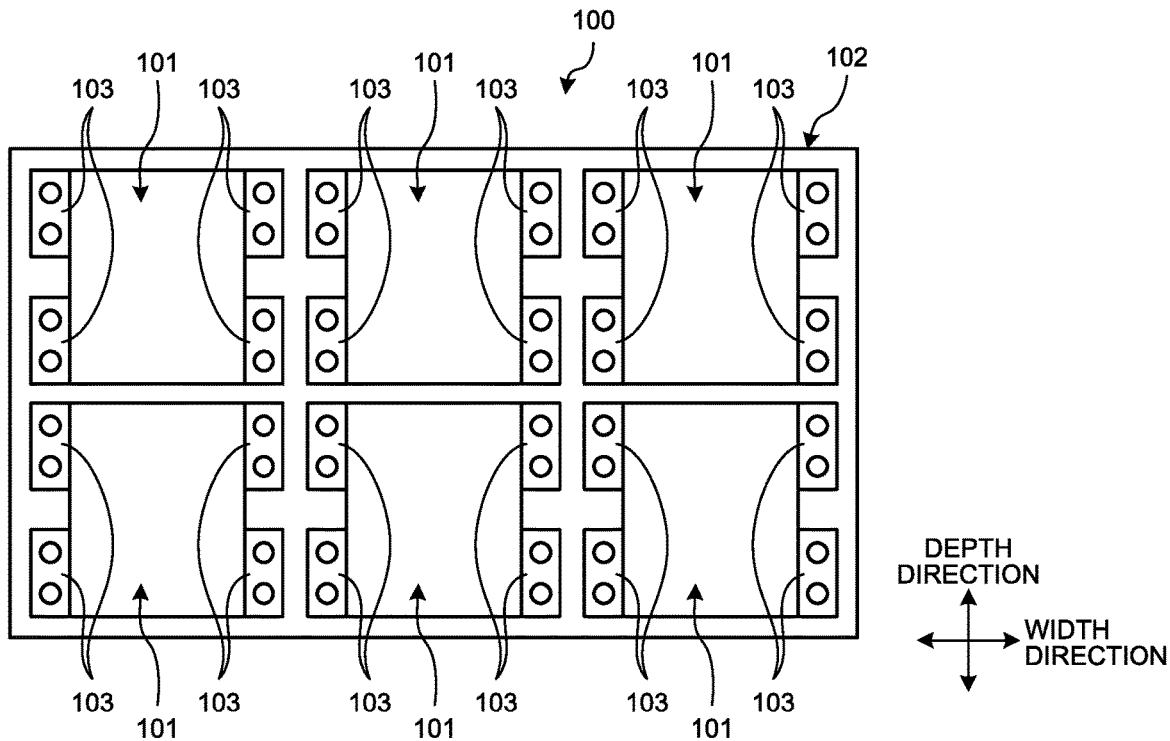
FIG. 7 is a schematic view illustrating the magnitude of a battery pack according to a comparative example.

In addition, in the battery pack 1, since the entirety of the battery assemblies 21 are connected in series by the bus bar 22 for battery assemblies and the bus bar 30 for modules, it is possible to raise an energy density. For example, as illustrated in FIG. 7, a battery pack 100 of the related art includes a holding member 103 that assembles battery modules 101 to a housing 102 of the battery pack 100. According to this, the size of the battery pack 100 of the related art tends to increase, and an energy density is relatively lowered. In contrast, in the battery pack 1 of this embodiment, the entirety of battery assemblies 21 are connected to each other in series by the bus bars (the bus bar 22 for battery assemblies and the bus bar 30 for modules), many holding members 103 as in the battery pack 100 of the related art are not necessary. According to this, in the battery pack 1 of the embodiment, for example, it is possible to further suppress an increase in size in comparison to the battery pack 100 of the related art as illustrated in FIG. 8, and thus it is possible to further raise the energy density in comparison to the related art. As a result, in the battery pack 1, it is possible to appropriately connect the plurality of battery cells 21a. Furthermore, in the battery pack 1, the entirety of a plurality of the bus bar 30 for modules are provided on an upper side of the battery modules 20 in the height direction, and thus a bus bar 30 for modules, which ranges between the battery modules 20 on a lower side in the height direction, is not present. Accordingly, in the battery pack 1, for example, it is easy to insert a heat conductive sheet (not illustrated), which dissipates heat of the battery modules 20, into between the battery modules 20 from the lower side in the height direction.

In the battery pack 1, the plurality of battery modules 20 are arranged in a width direction intersecting the depth direction. According to this, in the battery pack 1, it is possible to arrange the battery cells 21a in a cubic lattice shape, and it is possible to suppress an increase in size of the battery pack 1.

In the battery pack 1, the first bus bar piece 31 includes the first connection counter surface 31c, and the second bus bar piece 32 includes the second connection counter surface 32c. In addition, the connection portion 33 connects the first bus bar piece 31 and the second bus bar piece 32 in a state in which the first connection counter surface 31c and the second connection counter surface 32c face each other. According to this configuration, in the battery pack 1, for example, when the joining site between the first and second connection counter surfaces 31c and 32c is melted and is solidified by the laser welding, the first bus bar piece 31 and the second bus bar piece 32 can be connected to each other.

In the battery pack 1, the connection portion 33 includes the solidification portion 33a solidified from the molten body. According to this, in the battery pack 1, the first bus bar piece 31 and the second bus bar piece 32 are strongly connected to each other, and are electrically connected.

Modification Example

Next, a modification example of the embodiment will be described. Description has been given of an example in which the connection portion 33 includes the solidification portion 33a solidified from the molten body, but there is no limitation thereto. For example, the connection portion 33 may be provided with a nut having a fastening opening, and a bolt inserted into the opening and is fastened to the nut. In addition, the connection portion 33 may include a connector connection portion including a male connector provided with a first terminal, and a female connector provided with a second terminal that is fitted around the male connector and is electrically connected to the first terminal.

In addition, the number of the battery cells 21a of each of the battery assemblies 21 is not limited to four and may be two or greater.

In addition, the number of the terminals 22b of the bus bar 22 for battery assemblies is appropriately changed in correspondence with the number of the battery cells 21a of each of the battery assemblies 21. In addition, the number of the terminals 31b and 32b of the bus bar 30 for modules is appropriately changed in correspondence with the number of the battery cells 21a of the battery assembly 21.

In addition, the number of the battery assemblies 21 of the battery module 20 is not limited to four and may be an even number of two or greater.

Reference Example

A reference example of the battery pack 1 according to the embodiment will be described. A battery pack (not illustrated) according to the reference example is different from the battery pack 1 according to the embodiment in that battery bodies including one battery cell 21a is used instead of the battery assemblies 21 which include the plurality of battery cells 21a. In the reference example, the same reference numeral will be given to the same constituent elements as in the embodiment, and detailed description thereof will be omitted.

The battery pack according to the reference example includes a plurality of battery modules and a bus bar for modules. Each of the plurality of battery modules includes a plurality of battery bodies and a bus bar for battery bodies. The plurality of battery bodies include one battery cell 21a, are provided to be erected in the height direction in which the positive electrode and the negative electrode face each other, and are arranged in an even number in the depth direction orthogonal to the height direction. The bus bar for battery bodies connects battery bodies, which adjacent to each other in the depth direction, in series. The bus bar for modules is provided on one side of the plurality of battery modules in the height direction, and connects battery modules, which are adjacent to each other among the plurality of battery modules, in series. In addition, the bus bar for modules includes a first bus bar piece that is provided in a battery module on one side between the battery modules adjacent to each other, a second bus bar piece that is provided in a battery module on the other side and is different from the first bus bar piece, and a connection portion that connects the first bus bar piece and the second bus bar piece. According to the configuration, in the battery pack of the reference example, it is possible to attain the same effect as in the battery pack of the embodiment.

In the battery pack of the reference example, the plurality of battery modules are arranged in the width direction intersecting the depth direction. According to this configuration, in the battery pack, it is possible to arrange the battery cells 21a in a cubic lattice shape, and it is possible to suppress an increase in size of the battery pack.

In the battery pack of the reference example, the first bus bar piece includes a first connection counter surface and the second bus bar piece includes a second connection counter surface. In addition, the connection portion connects the first bus bar piece and the second bus bar piece in a state in which the first connection counter surface and the second connection counter surface face each other. According to this configuration, in the battery pack, for example, when a joining site between the first and second connection counter surfaces is melted by laser welding and is solidified, the first bus bar piece and the second bus bar piece can be connected to each other.

In the battery pack of the reference example, the connection portion is a solidification portion that is solidified from a molten body. According to this configuration, in the battery pack, the first bus bar piece and the second bus bar piece are strongly connected to each other, and are electrically connected.

In the battery pack according to the embodiment, since the bus bar for modules includes the connection portion that connects the first bus bar for modules and the second bus bar for modules, it is possible to suppress a manufacturing loss due to welding failure between the battery cells, and is possible to appropriately connect the plurality of battery cells.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A battery pack comprising:
a plurality of battery modules that includes a plurality of battery assemblies and a bus bar for battery assemblies, the plurality of battery assemblies including a plurality of battery cells connected to each other in parallel, each of the plurality of battery cells being provided to be erected in a height direction in which a positive electrode and a negative electrode are opposite to each other, and the plurality of battery assemblies being arranged in an even number in a first direction orthogonal to the height direction, the bus bar for battery assemblies connecting the battery assemblies adjacent to each other in the first direction in series; and
a bus bar for modules that is provided on one side of the plurality of battery modules in the height direction with respect to the plurality of battery modules, and connects the battery modules that are adjacent to each other among the plurality of battery modules, in series, wherein
the bus bar for modules includes a flat-plate-shaped first bus bar for modules that is provided in a battery module on one side between the battery modules adjacent to each other, and a flat-plate-shaped second bus bar for modules that is provided in a battery module on the other side and is different from the first bus bar for modules,
the plurality of battery modules are arranged in a second direction intersecting the first direction,
in each of the battery modules, a number of rows of the battery cells arranged along the first direction is greater than a number of rows of the battery cells arranged along the second direction,
the first bus bar for modules is located on the one side with respect to the plurality of battery modules in the height direction, and includes a first connection counter surface that is an end surface of the first bus bar for modules,
the second bus bar for modules is located on the one side with respect to the plurality of battery modules in the height direction, and includes a second connection counter surface that is an end surface of the second bus bar for modules, and
the bus bar for modules includes a connection portion connecting the first bus bar for modules and the second bus bar for modules in a state in which the first connection counter surface and the second connection counter surface face each other in the second direction.

* * * * *